United States Patent Office 3,252,873
Patented May 24, 1966

3,252,873
OBJECTIVE METHOD OF TESTING THE PUNGENCY AND ODOR OF ORGANIC SUBSTANCES
Marian L. Hobbs, Kansas City, Kans., assignor to Rutherford Food Corporation, Kansas City, Mo., a corporation of Missouri
No Drawing. Filed Oct. 1, 1962, Ser. No. 227,568
5 Claims. (Cl. 204—1)

This application is a continuation-in-part of application Serial No. 159,733, filed December 15, 1961, now abandoned.

This invention relates to a novel method of testing the relative pungency and odor of organic substances and provides a completely objective procedure for determining the pungency or odor of different types of products including spices, herbs, perfumes, colognes, certain foods and other substances that have distinct odors and tastes.

Heretofore, it has been the practice to use human tasters and sniffers to determine the pungency and odor of spices, herbs, perfumes and other products with the results thereby being subject to human factors, increasing the possibility of error in attempts to detect the relative pungency and flavor of the different substances. In accordance with one well-established taste test procedure, a specified amount of a powdered spice is introduced into a quantity of alcohol and the admixture permitted to macerate for a period of the order of 24 hours. Thereafter, serial dilutions of the clear supernatant liquid are diluted with 10% solution of sugar in distilled water. Each of five expert tasters are then directed to swallow 5 cc. of the diluted solution at once and to record the presence or absence of a distinct sensation of pungency in the mouth and throat. The value is expressed in terms of dilution required to produce a noticeable sensation of pungency and it is preferred that the solutions be tasted starting from the highest dilution and progressing toward the lowest dilution. In order to impart some validity to the test, it is necessary that 3 out of the 5 persons on the panel record the same values for the various dilute solutions. Numbers can be assigned to the dilutions if believed to be more valuable in the procedure.

It can be ascertained that the subject test set forth above introduces many variables into the testing operation and also necessitates the utilization of persons who are expert in the field of testing and thereby making the procedure relatively expensive and not entirely without error. The variable factors which can affect the determination of relative pungency and odor between perfumes or spices, herbs and other seasoning products include the following extraneous points.

First, the experience of the testers or sniffers is highly important in obtaining accurate results. Also, even though a number of testers are employed, there is no clear-cut way of determining that all of the judges are equally sensitive to one particular odor or that they are capable of more accurately determining the pungency or odor of one material over another. The availability, age, sex and health of the taste testers are also of significance because these factors can vary the results obtained. Psychological influences can have a bearing on the results depending upon the surroundings and environment in which the tests are conducted, as well as the palatability of the material which is being tested. It has been found that various persons, even experts in the field of tasting, have different thresholds of taste and smell sensitivity thereby introducing variables into the conclusions reached. Experts are required for making the taste or sniffing tests inasmuch as they should all be able to give taste scores substantially near standard values which are set by making a large number of tests. Also, the reliability of the test is in part dependent upon the number of testers used for each test, with the likelihood of error being decreased proportionally to the increase in number of persons who are engaged in the test. Additionally, utensils used in the test must be chosen to preclude the same imparting an odor to the goods under test and this is also applicable to the medium used to extract the flavor from the products under analysis. Finally, statistical methods should be employed to minimize the error with a number of testers being used and this involved mathematical procedure increases the expense and time required for testing of the products. Although the tests set forth above are particularly adapted for determining the relative tastes of substances, it can be seen that the same factors would apply with equal force to sniffing tests done by expert sniffers.

It is therefore the primary object of the present invention to provide an objective method of testing the relative pungency and odor of substances having a characteristic odor and reducing the necessity of employing human testers, thereby obviating the errors which occur in subjective testing methods.

An additional important object of the invention is to provide an objective method of testing for pungency and odor as described wherein one person may run the test and without the necessity of such person being an expert in the field of tasting or sniffing. A further important object in this respect is to provide a method of testing the relative pungency and odor of organic substances through utilization of conventional equipment that may be purchased at a reasonable price and operated by persons who have been given training in the use of the equipment, but are not required to have an extensive technical background or understand the details of the physical phenomena permitting objective testing as defined.

Another significant object of the invention is to provide an objective method of testing the relative pungency and odor of organic substances which may be carried out in a short interval of time, that is effective in testing the pungency or odor of any type of spice, herb or other seasoning material, perfume and food odor which may be detected by humans, and that may be readily compared with other samples of the same type of substance or with a previously standardized sample as may be required.

A particularly important object of the invention is to provide a method as set forth which is of characteristics permitting the same to be carried out without in any way altering the strength or pungency of the material undergoing testing, and which permits checking of the pungency and odor of both liquids and solids in a medium essentially the same as the liquid medium present in a human's oral or olfactory cavities, thereby causing the testing conditions to be substantially identical with the actual taste and odor detecting environments present when the person is eating or sniffing materials such as those undergoing testing.

Another important aim of the invention is to provide an objective method of testing the relative pungency and odor of organic substances permitting selection of a blend of spices, herbs and other seasoning substances, or perfume products as a standard, and then permitting subsequent formulation of a blend of identical characteristics notwithstanding variations in the individual ingredients with the pungency and odor strength thereof varying with conditions of handling, production from different geological areas, combining of several crops, and other similar variables.

Other important objects and details of the present method will become obvious or be explained in greater detail as the following description progresses.

In accordance with the preferred procedure of the present method, 0.100 gram of the solid or 0.1 milliliter of the liquid perfume, spice, herb or other food material to be tested is placed in a container such as a 10 milliliter beaker. Thereafter, 5 milliliters of distilled water is introduced into the beaker using a volumetric pipette and the liquid suitably agitated by the flow of water from the pipette to effect complete dispersion of the substance to be tested in the liquid. After it has been determined that all of the solid has been thoroughly dispersed in the liquid, and all of the water soluble portions thereof suitably dissolved in the liquid, the temperature of the liquid is recorded and the solution permitted to stand for 5 minutes whereupon the temperature should again be suitably recorded. This can be conveniently done by keeping a thermometer in a beaker or flask of distilled water from which the 5 milliliters referred to above is drawn. Next, the electromotive force in the solution is taken utilizing a conventional pH meter (e.g., a Beckman model G or GS or any accurate pH meter which will also measure E.M.F.) and with the reading preferably being in millivolts. It should be pointed out that these E.M.F. readings are not true oxidation-reduction measurements, although this phenomenon is undoubtedly partly involved. Instead of a metallic (platinum, gold or silver) electrode, a glass electrode (Beckman 290) is used in conjunction with a saturated calomel reference electrode (Beckman 270) which is filled with a saturated potassium chloride electrolyte, when model G or GS Beckman pH meter is used. If desired, a short period may again be permitted to elapse whereupon the E.M.F. is again read to determine if the E.M.F. readings are identical. If not, an additional period may be permitted to elapse whereupon the E.M.F. is again recorded with this procedure being repeated until successive E.M.F. readings are identical. In most instances, however, the 5 minute period initially specified is adequate and the last E.M.F. reading taken should be recorded as the final one.

The E.M.F. reading and water temperature should be recorded as read, and then converted to the equivalent reading for 25° C. in order to establish uniformity and standardization of readings, inasmuch as there is usually an increase in the E.M.F. with an increase in temperature. It is to be understood that an individual temperature-E.M.F. curve should be plotted for each food substance being tested. An alternative procedure, of course, would be to take all of the readings under conditions where the liquid is at exactly 25° C. thereby obviating the necessity of correlating the temperatures as specified above.

If a number of samples from different suppliers, different grades or at different times but of the same type of spice, herb, perfume, cologne or other food having a distinct odor or taste, and such samples are tested in accordance with the subject procedure, the relative odor or pungency between the samples is determined by the relationship of the E.M.F. readings. The sample having the lowest positive or the highest negative E.M.F. reading is the most pungent or has the strongest odor because the same is the least positive or the most negative, depending upon the manner in which the reading is interpreted. Higher positive E.M.F. readings indicate less pungency and materials of lower strength.

Various types of perfumes, spices, herbs and other organic substances may be tested in accordance with the subject method whether the same be of a solid or liquid character. Solids, however, should be ground to uniform particle size, prior to being introduced into the beaker to which the distilled water is added, and the solid material may even be subjected to the action of a blender if desired to place the same into a consistency for test purposes. For instance, a blender would be used to prepare a homogeneous mix from a heterogeneous mass, such as a canned food product like chili or tamales. However, this is not necessary when testing ground spices and similar substances. In any event, after admixture of the substance to be tested and the distilled water, it is desirable to agitate the solution sufficiently to effect complete dispersion of the solid in the liquid, if particulate material is being tested, and to obtain complete solubilization of the water soluble components of the solid, in the suspension medium.

Although the exact theory of operation of the present test procedure is not completely understood, it is thought that the same involves determination of the negative charge on the organic substance with those particles or the liquid having the greatest negative charge being the most pungent and having the highest flavor strength. Man can detect chemicals which are volatile enough after reaching his nasal cavity through the air to come in contact with specialized olfactory structures which are sensitive to odors. Most persons look upon smell as odors conveyed through the air, whereas substances are tasted by virtue of the material dissolving in the water in the oral cavity. Actually, in both cases the stimulating substances are conveyed to the olfactory and taste receptors by water in the sense that the substances must be in solution when they reach the end organs of taste in the mouth or those of smell in the nasal cavity before the person can detect the presence of the material. Usually, the substances a person is able to detect by their odor are very volatile chemicals, whereas the person is able to taste the materials which are not so volatile. However, it is to be recognized that so-called "tastes" are mixtures of reactions by the olfactory as well as the taste sensitive receptors. Therefore, all tastes or flavors can in fact be detected by the olfactory receptors, with the exception of the tastes of salt, sweet, sour and bitter which are detected by specific taste structures or buds in the tongue.

The olfactory area in the uppermost part of the human nasal cavity is innervated by the olfactory nerve. The sensory cells responsible for reception of odors consist of nerve cells from which sensory hairs protrude. These hairs are actually protoplasmic protrusions of dendrites of the modified nerve cell. Therefore, it is to be understood that the olfactory cells are only one of several different types of specialized receptors or sense organs which make up the nervous system. When a stimulus is applied to the olfactory receptors, the person is able to detect the odor by the electrical stimulus transmitted to the olfactory receptors.

In the normal physiology of an animal, action potentials may be produced on the neuron processes near terminal sensory endings, as well as at other locations on membranes subject to irritation, by action of physical or chemical stimulus force. Thus, any rapid change in the physical or chemical condition of the environment surrounding the neuron processes will initiate the passage of an impulse over a nerve. This passage may be measured physically by means of a galvanometer. Normally, in a resting or unstimulated state, all cell membranes including those of nerves, carry a positive charge on the outer surface of the membrane and a negative charge on the inner surface thereof. Whenever an action potential appears on a nerve capable of being irritated, such as an olfactory cell, by virtue of a stimulus force, the potential is "sensed" on a limited local area that is relatively negative with respect to the remainder of the membrane surface. As soon as the action potential appears, it begins to migrate as a wave of negativity by progressive depolarization of the advancing front and repolarization of the retreating edge. Thus it can be recognized that transmission of an impulse over a neuron or muscle cell may be represented by a continuous wave form wherein the outer positive charges are neutralized by negative charges in the surrounding medium and successively decrease in quantity as one end of the receptor is approached and then successively build up from the opposite extremity of the receptor as the negative impulse progresses over the nerve or muscle cell. It can therefore be seen that if the electrodes of a very sensitive galvanometer are placed on a nerve or muscle cell, a wave of negativity can be sensed as the same passes down the nerve each time the latter is stimulated. For these reasons, in order for a stimulus to be effective in stimulating an olfactory neuron, the stimulus must be a negatively charged force which will depolarize the nerve or muscle cell membrane to start the wave of negativity. It is also apparent that the greater the negativity of the stimulus, the greater will be the response or nerve impulses of the olfactory receptors. Some investigators, however, believe the action current may not be actually negative, but merely a less positive condition along the cell membranes.

Although the E.M.F. recordings made in accordance with the procedure set forth above will be recorded as positive readings on the pH meter and in the form of millivolts, it is to be recognized that this reading is positive probably because the levels of concentration of the test solutions are arbitrarily chosen for purposes of convenience in weighing, measuring and testing. In a group of two or more like substances being tested, the solution having the lowest positive E.M.F. reading will be the more pungent because it is the least positive in this particular concentration. As previously demonstrated, the substance with the highest negative charge will be the one which will stimulate the olfactory receptors to the greatest extent. The conclusions set forth have been further verified by empirical procedures showing that the greater the concentration of a test solution, the more positive the E.M.F. readings will be, and conversely, the more dilute the test solution, the less positive or more negative the E.M.F. readings will register.

The concentrations of chemicals necessary to excite the olfactory receptors are very dilute. For example, 0.01 milligrams of mercaptan in 230 cubic meters of air can be readily detected. The quantity of the mercaptan in direct contact with the end organs of the olfactory epithelium would be much smaller. Ether and oil of wintergreen can be detected by the olfactory sense organs in concentrations equal to 0.0005 milligram per liter of air; musk, in concentrations of 0.00012 milligram per liter; and vanilla can be detected in concentrations of 0.0001 milligram per liter. Therefore, it is obvious that the concentrations of the test solutions in the above-described procedure for determining flavor and pungency by measuring the electromotive force in solutions thereof are much greater than would actually be found to come in contact with the olfactory sense receptors.

The relationship of taste and chemical constitution has been studied by a number of investigators who have shown that taste in general is dependent upon the presence of certain groups such as the hydroxyl and amino groups. Those groups which have been found to confer a characteristic odor are —OH; —O—; —CHO; —CO.CH$_3$; —NO$_2$; —CN; —N$_3$; —SH; —S—; —NC; and —As. In the case of spices and other seasoning foods, the odor and taste or flavor are contained in the essential oils of the plants from which the natural spices or odoriferous materials are obtained. These essential oils are made up of acyclic and isocyclic hydrocarbons and their oxygenated derivatives. Some contain nitrogen and sulfur as well. It is possible to classify a large number of these materials into four main groups, which are characteristic of the majority of essential oils. These groups are (1) terpenes, related to isoprene and isopentene; (2) straight chain compounds, not containing any side branches; (3) benzene derivatives; and (4) miscellaneous compounds. As was previously noted, it can be seen that the groups on the various compounds which produce active tastes or odors are essentially negative radicals attached to organic materials. If a considerable degree of ionization takes place, the hydrogen ions produced tend to offset the negative charge of the negative radicals, thereby decreasing the pungency and flavor strength of the composition. The present objective method of testing the relative pungency and odor of organic substances is based on the fact that the greater the amount of pungent groups in a given amount of sample of perfume, spice or the like, the greater the pungency thereof.

In this respect, it is to be noted that water is to be preferred as a solvent for the materials to be tested for a number of important reasons. First, one of the basic requirements for a substance to have odor is that it be soluble in water. Secondly, water does not evaporate as quickly as alcohol or acetone and thus a state of equilibrium is achieved and maintained more easily with water as the dispersion medium. Finally, it is to be noted that the state of oxidation of a pungent substance is of extreme importance, and therefore it is advisable to use water as the solvent because it tends to retard oxidation and this assists in obtaining and maintaining stabilized readings. On the other hand, acetone and other polar compositions influence oxidation, which affects the validity of the readings.

The electrical charges on the olfactory receptors have been previously described, but it is also to be understood that charges exist on colloids made up of the substances to be tested. It is assumed that the electrical forces on the colloidal particles will be in substantial equilibrium and thereby in an electrical double layer. The sources of this electrical double layer are said to be, first, the forces of residual valencies which cause oriented adsorption; second, the forces of dissociation which cause exchange adsorption; and, third, the spontaneous distribution of ions at the free surface of the material and which are to be set up at the boundary of substances which are totally unreactive from a chemical standpoint and are incapable of dissociation. The third source described above is illustrated by substances such as cellulose, collodion or air bubbles. In these cases, there is no oriented adsorption, nor is there a tendency to dissociate which is certainly true of air bubbles. Yet a charge exists at the interface of these substances, and which may be explained as a difference in the capillary activity of H+ and OH— ions. It is believed that the OH— ion is more capillary active than the H+ ions and, therefore, the OH— ions enter or are drawn closer to the actual surface of the material than the H+ ions, thereby creating a zone of potential difference with the negative ions on the outer face of the material.

It has been theorized that a solid wall is always positively charged with respect to an aqueous solution, if the substance of the wall is acidoid. It therefore follows that the wall is always negatively charged if such wall is a basoid. Therefore, a wall may be either positively or negatively charged, depending on the hydrion concentration of the solution, if its substance is amphoiytoid. Just as in the case of a true ampholyte, zero charge on an ampholytoid is present only at its isoelectric point, the charge varying directly with the hydrion concentration. The isoelectric point of the wall, depending upon the chemical nature of its substance, may be an acid, neutral, or alkaline reaction, and it is represented by the middle point of a more or less wide isoelectric zone.

All that has been discussed above with respect to solid walls is entirely applicable to any food particles or the like which are suspended in water and further applies with equal force to colloidal solutions. Thus the electrical charge phenomena of colloidal solutions is rendered completely analogous to the dissociation phenomena of electrolytes in true solution. The laws of dissociation hence appear as a limiting case for the condition where the dissolved electrolyte approaches molecular dispersion. On the other hand, the electric charge phenomena in a colloidal solution appears as a limiting case for an electrolyte solution in which the dissolved electrolyte becomes more coarsely dispersed and finally acquires the character of a solid "wall."

It therefore follows, then, that the more coarsely ground a spice, the less electrical charge phenomena which will be registered. For this reason, if several different samples of a spice such as capsicum are tested with a pH meter, the electromotive force registered will be less in the suspension having the coarsest grind.

Some or all of the essential oils of spices, when oxidized, form acidic derivatives. For instance, cuminic aldehyde on oxidation yields cuminic acid. Thus a spice which has lost some of its pungency from being exposed to air and thereby resulting in oxidation of the essential oils contained therein will show a higher E.M.F. reading than a more pungent or less oxidized sample, by virtue of the presence of the acids with greater hydrogen ion activity in the oxidized sample, which tend to neutralize the negative charges of the odor radicals.

To be satisfactory, an objective measure of odor or pungency should correlate closely with subjective determinations. In the case of spices, the results of objective tests by means of a pH meter utilized to make electromotive force readings corresponded closely with pungency readings made by subjective sniff tests by an expert in the field. The only exceptions encountered were in those cases where the pungency of several samples of the same kind of spice was so nearly identical that the difference could not be distinguished subjectively, although there were slight differences in the E.M.F. readings of the samples.

Through incorporation of an objective method of testing the relative flavor of food products into a regular quality control procedure for spices or other foods, it is possible to control the flavor of the products regardless of the source of the foods. It is well known that flavors of seasoning agents will vary in accordance with the source from which the agents are obtained, as well as the way in which the products were handled, the age of the material, and processing operations carried out to purify and render the substances sanitary. Thus if a spice has been determined to give the best flavor at a particular strength, this flavor may be reduplicated at subsequent times by simply blending similar materials of different strengths together to produce a final product of standard flavor. Furthermore, the final finished product into which the seasoning materials have been introduced may also be tested if desired to determine that the flavor thereof is uniform and in accordance with a standard. It should be noted at this juncture that the test results are dependent upon comparison between various materials, but it is recognized that the tests may be conducted on a blend of substances if required, and again the E.M.F. readings will indicate the most pungent substances or those having the strongest flavor. It is to be understood that the most desirable flavor must be selected subjectively, and thereafter the flavor may be repeated by the objective tests outlined.

The same procedures are equally applicable to perfumes and perfumed products in that once a standard has been established for a particular material, the quality control of the substance can be readily maintained through simple, efficient and effective tests as outlined herein. Since most perfumes are dissolved in alcohol, it is to be understood that a quantity of this alcoholic solution, and of the order previously mentioned, is added to the required amount of distilled water and the solution tested in the prescribed manner.

The method as set forth herein may also be employed under certain circumstances to indicate spoilage of food products, as, for example, the amount of hydrogen sulfide contained in a quantity of eggs. Other food products may be subjected to the present test to determine if such food has spoiled sufficiently to render the products unusable.

Having thus described the invention what is claimed as new and desired to be secured by Letters Patent is:

1. An objective method of testing the relative values of potential olfactory stimulus strength of different supplies of one type of a liquid or solid organic substance capable of stimulating the olfactory nerve and comprising dispersing substantially equal quantities of a sample from each of said supplies of said substance, in respective individual, substantially equal quantities of water; conducting an initial measurement of the E.M.F. in the individual solutions by means of a glass electrode in conjunction with a calomel reference electrode; and conducting another measurement of the E.M.F. in the individual solutions after the expiration of a predetermined time period whereby upon correlation of the E.M.F. measurements in relation to the relative temperatures of the solutions, the sample with the strongest odor is determined by the lowest positive E.M.F. measurement.

2. A method as set forth in claim 1 wherein said time period is about 5 minutes.

3. An objective method of testing the relative values of potential olfactory stimulus strength of different supplies of a normally solid organic substance capable of stimulating the olfactory nerve and comprising reducing substantially equal quantities of a sample of each supply of said substance to relatively fine particle size; dispersing the separate quantities of said substance in respective individual, substantially equal quantities of water; and measuring the relative E.M.F. in the individual solutions by means of a glass electrode in conjunction with a calomel reference electrode whereby upon correlation of the E.M.F. measurements in relation to the relative temperatures of the solutions, the sample with the strongest odor is determined by the lowest positive E.M.F. measurement.

4. An objective method of testing the relative values of potential olfactory stimulus strength of different supplies of one type of a solid organic substance capable of stimulating the olfactory nerve and comprising dispersing approximately 0.100 gram of a sample from each of said supplies of said substance, in respective individual, approximately 5 ml. quantities of water; and measuring the relative E.M.F. in the individual solutions by means of a glass electrode in conjunction with a calomel reference electrode whereby upon correlation of the E.M.F. measurements in relation to the relative temperatures of the solutions, the sample with the strongest odor is determined by the lowest positive E.M.F. measurement.

5. An objective method of testing the relative values of potential olfactory stimulus strength of different supplies of one type of a liquid organic substance capable of stimulating the olfactory nerve and comprising dispersing approximately 0.1 ml. of a sample from each of said supplies of said substance, in respective individual, approximately 5 ml. quantities of water; and measuring the relative E.M.F. in the individual solutions by means of a glass electrode in conjunction with a calomel reference electrode whereby upon correlation of the E.M.F. measurements in relation to the relative temperatures of the solutions, the sample with the strongest odor is determined by the lowest positive E.M.F. measurement.

References Cited by the Examiner

UNITED STATES PATENTS

| | | | |
|---|---|---|---|
| 2,757,132 | 7/1956 | Northrop | 204—195 |
| 2,782,151 | 2/1957 | Suthard | 204—1 |
| 2,822,324 | 2/1958 | Gaylor et al. | 204—195 |
| 2,851,411 | 9/1958 | Ely | 204—195 |
| 3,084,030 | 4/1963 | Ballou et al. | 204—195 |
| 3,096,258 | 7/1963 | Poulous | 204—195 |

JOHN H. MACK, *Primary Examiner.*

MURRAY A. TILLMAN, WINSTON A. DOUGLAS,
*Examiners.*